United States Patent Office 3,629,212
Patented Dec. 21, 1971

3,629,212
REACTIVATION OF ZIEGLER-TYPE CATALYSTS
Kurt Benedikter, Karl Otto Hagel, and Klaus Kiepert, Marl, Germany, assignors to Chemische Werke Huls A.G., Marl, Germany
No Drawing. Continuation of abandoned application Ser. No. 548,051, May 6, 1966. This application Aug. 26, 1969, Ser. No. 853,627
Claims priority, application Germany, May 8, 1965, P 15 70 352.3
Int. Cl. C08f 1/56, 15/04
U.S. Cl. 260—80.78
6 Claims

ABSTRACT OF THE DISCLOSURE

Ziegler catalysts are reactivated after the catalysts are either partially or preferably completely inactive by the addition of a variety of reactivators, notably sulfur compounds, such as thionyl chloride. The preferred process comprises at least three serially connected reactors wherein the reactivators are continuously added to all but the first reactor.

---

This application is a continuation of Ser. No. 548,051, filed May 6, 1966, now abandoned.

This invention relates to an improved process for the production of polymers based on the use of Ziegler-type catalysts, and more particularly to a method of reactivating such catalysts.

It is old to polymerize 1-olefins and mixtures thereof, as well as mixtures of 1-olefins and multiple olefins at low-pressure by means of Ziegler-type organometallic mixed catalysts from compounds of the elements of Groups I to III of Mendeleev's Periodic Table, on the one hand, and Subgroups IV to VI and VIII of said Periodic Table, on the other hand. For producing amorphous copolymers, particularly suitable components in the mixed catalyst are vanadium compounds and alkyl aluminum halogenides, it being preferred to employ those vanadium compounds which are soluble in the inert solvent wherein the polymerization is conducted.

The known processes are, however, burdened by the disadvantage that the catalysts must be employed in relatively high concentrations, since the quantity of polymerizate formed per unit of catalyst is relatively small, as compared to other catalytic processes. Moreover, these catalysts have the great deficiency of being effective for only a very short period of time, their activity being substantially diminished after only a few minutes. Therefore, it is necessary to use the monomers in a very high concentration in order to utilize the activity of the catalyst to the greatest extent. This produces, however, a highly exothermic condition. Large heats of polymerization can be controlled to only a very limited degree, especially since the removal of heat in such solution polymerization processes is, as experience has shown, considerably hampered by deposits of polymerizate on the reactor walls, which deposits act as insulation. All of these disadvantages contribute to the production costs of these polymerization processes.

To increase the efficiency of the catalysts, modified mixed catalysts have already been suggested containing as the modifying component one or several compounds, for example, the esters of chlorinated organic acids or halogenides of organic or inorganic sulfo-acids or sulfur-containing acids. Though, with the aid of such additives, the relatively short life catalyst systems are more efficient, there remains the problem of heat removal because rapid polymerization is still required in order to utilize the life of the catalyst economically.

According to another known technique the activity of the catalyst can be increased by having present during the polymerization from 0.1 to 40 mols per mol of the compounds of Subgroups IV to VI and VIII of the mixed catalyst of a compound of the formula:

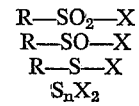

$$R-SO_2-X$$
$$R-SO-X$$
$$R-S-X$$
$$S_nX_2$$

wherein R represents halogen, alkyl having preferably 1 to 15,000 carbon atoms, cycloalkyl having preferably 4 to 22 carbon atoms and 1 to 5 rings, aryl having preferably 6 to 22 carbon atoms and 1 to 5 rings, or the halogenated derivatives of the previously described alkyl, cycloalkyl, and aryl,
X represents halogen, and
$n$ is 1 or 2.

The present invention is an improvement over the aforesaid modified catalyst, particularly with respect to the problem of heat removal.

It is therefore a principal object of this invention to provide an improved process for the production of high-molecular weight polymers, using a modified Ziegler-type catalyst.

A particular object of this invention is to provide an improved process for the polymerization of amorphous copolymers which can be vulcanized.

It is still another object of this invention to provide novel compositions incident to the novel processes of this invention.

Upon further study of the specification and appended claims, further objects and advantages of this invention will become apparent.

To attain the objects of this invention, a process is provided wherein it has been discovered that, by adding at least part of modifying agents (hereinafter referred to alternatively as activators, reactivators, or promoters) to the polymerization solution after the catalyst has been at least partially expended, the activity of the catalyst is thereby reactivated. Even more surprising is that, when it appears that the Ziegler-type catalyst is completely devoid of activity, the addition of a promoter restores its activity. In this way, it is possible to control the rate of heat evolution, while at the same time utilizing the catalyst with a greater efficiency.

The promoters to be added to the previously described Ziegler-type catalyst comprise the aforesaid sulfur-containing catalysts, esters, chlorides and bromides of halogenated carboxylic acids, unsaturated halogenated cycloaliphatics, azo compounds, and compounds forming azo compounds during the polymerization reaction.

Thus, a multi-step process is involved wherein, in the first step, the polymerization is conducted conventionally to the extent feasible with respect to heat removal. In the next step, the promoter is added to the at least partially expended Ziegler-type catalyst, and the polymerization solution is further polymerized.

1-olefins suitable for copolymerizing are, in addition to ethylene, particularly propylene, butene-(1), pentene-(1), hexene-(1), decene-(1), and others having preferably not more than 12 carbon atoms. Also branched 1-olefins can be employed, such as, for example, 4-methylpentene-(1).

The process is successful when copolymerizing two or more of these olefins in any desired molar ratio. Preferred are mixtures containing ethylene, for example, mixtures of ethylene and propylene, or of ethylene and butene-(1), particularly in a molar ratio of between 1:10 and 10:1, such copolymers having optimum properties and being the most commercially important at this time.

The improved catalyst system of this invention can also be advantageously used to form copolymers of 1-olefins, copolymers of a 1-olefin and multiple olefins, as well as terpolymers of multiple olefins and at least two 1-olefins. Preferred are mixtures of the above-mentioned 1-olefins, particularly those containing ethylene, preferably mixtures of ethylene and propylene or of ethylene and butene-1, since they lead to copolymers having optimal properties.

Multiple olefins as herein defined are polyethylenically unsaturated monomers having preferably 2–3 double bonds and 3–22 carbon atoms used in the copolymerization as, for example, 1,4-hexadiene, 1,9-octadiene, 6-methyl-1,5-heptadiene, 1,7-nonadiene, 1,5-hexadiene 1,4-pentadiene 2-methyl-1,4-pentadiene, 3-methyl-1,4-hexadiene, 4-methyl-1,4-hexadiene, 1,9-decadiene, allene, 1,4,9-decatriene, trivinylcyclohexane, dicyclopentadiene, alkenyl-norbornenes as, for example, methylene-norbornene, butenyl-norbornenes, propenyl-norbornene, vinyl-norbornene, cyclohexenyl-norbornene, 3,5-dimethylhexenyl-norbornene, 1,5-dimethyl-hexenyl-norbornene, methyl-butenyl norbornenes, 1-methyl-5-octyl-hexenyl-norbornene, allyl norbornene, cycloalkenes as cyclooctadiene-1,5 and polycyclic polyenes as for example 4,7,8,9-tetrahydroindene, 6,7,8,9-tetrahydroindene, 4,5,8,9-tetrahydroindene 5-methyl-4,7,8,9-tetrahydroindene, 5,6-dimethyl-4,7,8,9-tetrahydroindene.

These dienes and trienes and ethylene and the 1-olefins, respectively, are useful for the production of a very great quantity of copolymers; only a small number of these copolymers can be specified here. They include ethylene/propylene/1,4-hexadiene,
ethylene/1-butene/1,4-hexadiene,
ethylene/propylene/dicyclopentadiene,
ethylene/1-butene/dicyclopentadiene,
ethylene/propylene/1-butene/dicyclopentadiene,
ethylene/propylene/methylene-norbornene,
ethylene/1-butene/methylene-norbornene,
methylene/1-hexene/methylene-norbornene,
ethylene/propylene/methyl-butenyl-norbornene,
ethylene/1-butene/methyl-butenyl-norbornene,
ethylene/1-decene/methyl-butenyl-norbornene,
ethylene/propylene/dimethyl-hexenyl-norbornene,
ethylene/1-butene/dimethyl-hexenyl-norbornene,
ethylene/propylene/butenyl-norbornene,
ethylene/1-butene/1-butenyl-norbornene,
ethylene/propylene/propenyl-norbornene,
ethylene/propylene/methyl-tetrahydroindene and
ethylene/1-butene/methyl-tetrahydroindene.

In all of these copolymers, the amount of ethylene ranges from 20 to 80 mol percent, of 1-olefins from 80 to 20 mol percent and of dienes or trienes from 0 to 25 mol percent. Preferred are copolymers containing an amount of ethylene from 30 to 70 mol percent, of 1-olefins from 70 to 30 mol percent and of dienes or trienes from 0 to 15 mol percent. Therefore not only unsaturated, but also saturated copolymers can be produced by the new process. Copolymers from ethylene and propylene, from ethylene and 1-butene and from ethylene, propylene and 1-butene are examples for such saturated copolymers that are vulcanizable by means of organic peroxides.

The mixed catalyst system in which the sulfur compounds of this invention are used is for example of the type disclosed by Ziegler in German Pat. No. 973,626, and also in "Linear and Stereoregular Addition Polymers," Gaylord and Mark, Interscience, N.Y., London (1959), under Ziegler-type catalysts. Such catalysts can, for example, be produced from organometallic compounds of Groups I to III of Mendeleev's Periodic Table, as for example, those having at least one hydrogen atom or an alkyl group or aryl group linked to the metallic atom, on the one hand; and compounds of the transition elements of Subgroups IV to VI and VIII of the Periodic Table, preferably those of vanadium on the other hand.

Particularly suitable as compounds of Groups I to III of the Periodic Table are, for example, sodium amyl, lithium butyl, zinc diethyl, aluminum compounds, such as, aluminum trialkyl, triaryl, triaralkyl compounds, such as aluminum trimethyl, aluminum triethyl, aluminum triisobutyl, aluminum triphenyl, aluminum tri(ethylphenyl), as well as mixtures thereof, and furthermore dialkyl aluminum monohalides, such as diethyl aluminum monochloride or diethyl aluminum monobromide, and also the monoalkyl aluminum dihalides, for examples, monoethyl aluminum dichloride and monoethyl aluminum dibromide. It is preferable to employ the mixtures referred to as alkyl aluminum sesquichloride, consisting of equimolar amounts of dialkyl aluminum monochlorides and alkyl aluminum dichlorides, such as, for example, ethyl aluminum sesquichloride and also alkyl aluminum hydrides, such as diethyl aluminum monohydride and diisobutyl aluminum monohydride.

Particularly suitable compounds of metals of Subgroups IV to VI of the Periodic System are titanium tetrachloride, and chloro-titanic acid esters, such as dichlorotitanic acid diethyl ester [Ti(OC$_2$H$_5$)$_2$Cl$_2$], and preferably vanadium compounds such as vanadium trichloride, vanadium tetrachloride, and vanadium oxytrichloride, furthermore vanadium esters, such as vanadium triacetate [V(C$_2$H$_5$O$_2$)$_3$] and vanadium triacetylacetonate

[V(C$_5$H$_7$O$_2$)$_3$]

also molybdene pentachloride, molybdene oxychloride (MoOCl$_4$ and MoO$_2$Cl$_2$) and tungsten hexachloride. Suitable compounds of metals of Subgroup VIII are cobalt naphthenate, cobalt octoate, cobalt chloride and nickel naphthenate.

The range of the Me$^{I-III}$ Me$^{IV-VI-VIII}$ mol ratios of these catalyst components, in this invention, is 30:1 to 1:1, preferably 12:1 to 4:1.

The copolymerization is usually conducted in the presence of inert diluents, but it can be carried out in the absence thereof. Suitable inert diluents include, for example, hydrocarbons or hydrocarbon mixtures which are liquid under the polymerization conditions, such as butane, pentane, hexane, cyclohexane, isopropylcyclohexane, petroleum fractions, such as petroleum ether; furthermore benzene, toluene, and xylene, or also chlorinated hydrocarbons, such as chlorobenzene and mixtures thereof. Particularly suitable are mixtures of aliphatic and cycloaliphatic hydrocarbons, for example hexane and isopropylcyclohexane.

A particularly smooth reaction is obtained if mixed catalysts are employed which are either soluble in the diluents or remain colloidally distributed therein. Particularly suitable are the reaction products obtained by combining vanadium compounds, such as vanadium tetrachloride or -oxytrichloride, as well as vanadium esters, with organometallic compounds of aluminum, such as triethyl aluminum, triisobutyl aluminum, trihexyl aluminum, diethyl aluminum monochloride, or ethyl aluminum sesquichloride, in an inert diluent.

The polymerization reaction takes place within a very wide temperature range of −80 to +120° C., preferably between −30 and +60° C. Although satisfactory reaction rates are realized at atmospheric pressure, the reaction can also be conducted at superatmospheric pressures of 1 to 50, preferably 1 to 10 atmospheres.

Processing of the polymers produced is carried out in a conventional manner, preferably by decomposing the mixed catalyst by the addition of substances containing an active hydrogen, such as water, alcohol, or carboxylic acids, and then washing the polymerization-cements. The polymerizate also can be conventionally processed by precipitation thereof with alcohol, or evaporation of the diluent by steam distillation.

Activating or reactivating additives which are suitable in this invention, called "promoters" in the examples, include all the sulfur compounds of the general formula

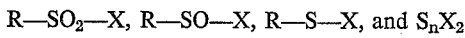

R—SO$_2$—X, R—SO—X, R—S—X, and S$_n$X$_2$ wherein R represents halogen, alkyl having preferably 1 to 15,000 carbon atoms, cycloalkyl having preferably 4 to 22 carbon atoms and 1 to 5 rings, aryl having preferably 6 to 22 carbon atoms and 1 to 5 rings, or the halogenated derivatives of the previously described alkyl, cycloalkyl, and aryl, X represents halogen, and
$n$ is 1 or 2.

Particularly suitable sulfur compounds which can be employed with the mixed catalyst are, for example, sulfoacid halides, such as benzene sulfochloride, benzene sulfobromides, o- or p-chlorobenzene sulfochlorides, o-, p-dichlorobenzene sulfochloride, p-toluene sulfochloride, p-toluene sulfobromide, tetrapropylene benzene sulfochloride, and other alkyl benzene sulfohalides, higher sulfochlorinated hydrocarbons having more than 6 carbon atoms with one or several sulfochloride groups, sulfinic acid halides, such as benzene sulfinic acid chloride, p-toluene sulfinic acid chloride, o- or p-chlorobenzene sulfinic acid chloride, o-, p-dichlorobenzene sulfinic acid chloride, sulfenic acid chlorides, such as benzene sulfenyl chloride, p-toluene sulfenyl chloride, o- or p-chlorobenzene sulfenyl chloride, o-, p-dichlorobenzene sulfenyl chloride, trichloromethane sulfenyl chloride, sulfuryl halogenides, such as sulfuryl chloride, thionyl halides, such as thionyl chloride, and sulfur halides, such as disulfur dichloride or sulfur dichloride.

Further suitable activating additives include esters and chlorides and bromides of chlorinated organic acids. Generally speaking, such esters of chlorinated organic acids are those produced from alkanoic saturated or unsaturated acids having one to eighteen carbon atoms and of alkanols having one to eighteen carbon atoms, lower alkanols being preferred. Suitable esters are, for example, the methyl and ethyl esters of trichloroacetic acid, dichloroacetic acid and monochloroacetic acid, the butyl ester of perchlorocrotonic acid, the methyl, ethyl, dodecyl and hexadecyl esters of 9,10-dichlorostearic acid of 9,10-12,13 - tetrachlorostearic acid, and of 9,10 - 12,13 - 15,16-hexachlorostearic acid, the methyl and ethyl esters being preferred; another suitable ester is the chloroformic acid ethyl ester.

Suitable chlorides and bromides of chlorinated organic acids are, for example, the chlorides and bromides of chloroformic acid, mono-, di- and trichloroacetic acid, perchlorocrotonic acid, and of the di-, tetra- and hexachlorostearic acids.

Still further activating additives are unsaturated halogenated cycloaliphatic compounds, such as hexachlorocyclopentadiene.

Another group of promoters are azo compounds, such as azobenzene. These azo compounds are broadly defined by the formula R—N=N—R', R and R' being substituted or unsubstituted alkyl, cycloalkyl and aryl groups, as, for example, methyl ethyl, n- and isobutyl, hexyl and dodecyl groups, cyclohexyl, cyclooctyl and cyclododecyl groups. Preferred are phenyl and naphthyl groups containing 6 to 20 carbon atoms, unsubstituted or substituted by halogen atoms, hydroxy groups or lower alkyl, alkoxy, aryl and aryloxy groups containing up to 10 carbon atoms. These compounds include, for example, azobenzene, azotoluene, chloroazobenzene, methoxyazobenzene, diphenylazobenzene, naphthalene, azobenzene, phenylazostilbene. Also compounds are suitable that form azo compounds during the polymerization reaction. Such compounds are, for example, substituted and unsubstituted azooxybenzenes, nitrosobenzenes, nitrobenzenes, phenylhydroxylamines; these compounds form azo compounds in presence of the metallo organic compounds during the polymerization reaction.

All of these compounds may be substituted by nitroso-, nitro- or hydroxyamine groups.

Also five- and six-membered aromatic compounds that contain said —N=N—group are suitable, as for example 1.2.4.5-tetrazine, 1.2.4-triazine, 1.2.3.-triazoline, 1.2.3.-triazole and -tetrazole; cyclic arylazo compounds, as, for example, benzo cinnoline and its derivatives; bis azo compounds as defined by the formula

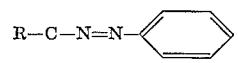

wherein R has the meaning of the above definitions.

Preferred compounds are the above-mentioned sulfur compounds and the esters and chlorides of chlorinated organic acids, since they are the most effective ones.

Preferably, these compounds are not added until the polymerization rate of the first polymerization stage, wherein optionally no activators are used, has abated to such an extent that the addition of the activating agents does not lead to an excessive increase in the polymerization reaction which would be difficult to control from the standpoint of withdrawing the exothermic heat of reaction.

The activating additives are employed in amounts sufficient to activate or reactivate the catalyst, generally quantities of 0.1 to 99, preferably 5 to 85 molar percent, based on the metal-carbon or metal-hydride bonds of the organometallic compounds or the metal hydrides of Groups I to III of the Periodic Table of the elements which are employed. When using diethyl aluminum monochloride instead of monoethyl aluminum dichloride, the amount of said promoter may be doubled.

These substances are preferably charged in the form of a solution. Solvents suitable in this connection are the above-mentioned solvents wherein the polymerization is conducted.

As one aspect of this invention, the exhausted mixed catalysts can be reactivated several times in the manner described above. Thereby it is possible, in a most advantageous manner, to prolong the lifetime of the mixed catalysts employed in the process, the catalyst thus being utilized to the most advantageous degree possible.

The catalyst is most efficiently utilized by the stepwise reactivation of a polymerization solution which has already become inactive. This is done by the addition of the reactivating agents in several serially connected reactors, rather than adding the entire amount of activator in only the first reactor.

This effect of reactivating of catalysts which are mostly or even completely incapable of catalyzing the polymerization, is particularly surprising, because the reactivating agents, if employed in larger quantities, would, as is known, destroy the catalyst.

The novel process additionally has the advantage that it is possible to cool the polymerization solution in an intermediate step between the individual process steps before adding the reactivating component, so that the removal of heat is economical, and can be easily controlled. For example, the polymerization solution can be beneficially cooled from high polymerization temperatures of about 80 to 90° C. to lower and safer temperatures, as, for example, 40 to 50° C.

In contradistinction to the presently claimed process, although an intermediate cooling step was also possible in the previously known methods, the polymerization could be reinitiated only by again adding the Ziegler-type catalyst, or by the addition of at least one catalyst component essential for forming the catalyst (organometallic compounds of the elements of Groups I to III of the Periodic Table, or compounds of elements of Subgroups IV to VI or VIII of the Periodic Table). However, by such measures, the process becomes less economical because larger quantities of catalyst are expended. This is particularly evident since the additional amount of polymer obtained thereby is not proportional to the additional quantity of catalyst employed. Another disadvantage is that the quality of the product decreases because of a larger proportion of ash components.

The polymers produced by this invention include copolymers of mono-α-ethylenically unsaturated hydrocarbons, preferably having from 2 to 12, preferably 2 to 4 carbon atoms, as well as terpolymers thereof additionally containing a multiple olefin having from 3 to 22, preferably 6 to 15 carbon atoms and 2 to 3, preferably 2 double bonds.

Without further elaboration, it is believed that one skilled in the art can, using the preceding description, utilize the present invention to its fullest extent. The following preferred specific embodiments are, therefore, to be construed as merely illustrative, and not limitative of the remainder of the specification and claims in any way whatsoever.

EXAMPLE 1

The terpolymerization of ethylene, propylene, and dicyclopentadiene is conducted continuously in a laboratory apparatus of three series-connected 2-liter glass reactors. First, the process is conducted in all three reactors without the addition of promoters; then, the promoters are added only in the second and third reactor. The catalyst components ethyl aluminum sesquichloride and $VOCl_3$ are added in only the first reactor, and the monomer is charged in excess. A further introduction of the charged monomer does not cause a further increase in solids content.

This test, when conducted without the addition of promoters (Test 1) demonstrates that the catalyst in the second and third reactors becomes completely inactivated. Only by adding the promoter in the second and third reactors is it possible, as shown in Tests 2 to 4, to reactivate the catalyst.

Test conditions:
0.5 millimol $VOCl_3$ per liter of hexane
6 millimols ethyl aluminum sesquichloride per liter of hexane
Molar ratio of ethylene:propylene:dicyclopentadiene in the charge=1:2:0.075.

Ethylene charged: 60 liters per hour
Pressure: 1 atmosphere absolute
Temperature: 35° C.
Average residence time in each of the three reactors: 1 hour.

TABLE 1

| Test No. | Reactor No. | Solids content of solution, percent by weight | G. polymerizate/g. $VOCl_3$ | G. polymerizate/g. ethyl-Al-sesquichloride | Type of promoter | mMol promoter/l. hexane |
|---|---|---|---|---|---|---|
| 1 | 1 | 2.2 | 173 | 20 | | |
|  | 2 | 2.2 | 173 | 20 | | |
|  | 3 | 2.2 | 173 | 20 | | |
| 2 | 1 | 2.2 | 173 | 20 | | |
|  | 2 | 4.5 | 353 | 41 | Thionyl chloride | 1 |
|  | 3 | 6.3 | 495 | 58 | do | 1 |
| 3 | 1 | 2.2 | 173 | 20 | | |
|  | 2 | 4.4 | 346 | 40 | Trichloroacetic acid methyl ester | 1 |
|  | 3 | 6.2 | 487 | 57 | do | 1 |
| 4 | 1 | 2.2 | 173 | 20 | | |
|  | 2 | 4.3 | 338 | 39 | p-Toluenesulfochloride | 1 |
|  | 3 | 6.1 | 480 | 56 | do | 1 |

The terpolymers produced in this manner contain 4 to 5 double bonds per 1000 carbon atoms and between 47 and 58% by weight of propylene; they are vulcanizable with sulfur.

If the entire amount of promoter is added in only the first reactor, the solids contents are lower (4.8 to 5% by weight) than if said entire amount is divided into three equal amounts and introduced into all three reactors. This demonstrates the advantage of adding increments.

Similar results are obtained when using, instead of— thionyl chloride:
    disulfur dichloride, sulfuryl bromide,
    o-chlorobenzene sulfinic acid chloride,
    p-chlorobenzene sulfenyl chloride,
    sulfochlorinated polyolefine having about 12,000 carbon atoms.

trichloro acetic acid methyl ester:
    perchlorocrotonic acid butyl ester,
    9,10–12, 13-tetrachlorostearic acid octadecyl ester,
    chloroformic acid bromide,
    dichloroacetic acid chloride,
    dichlorostearic acid bromide.

p-toluenesulfochloride:
    azobenzene,
    chloroazobenzene,
    methoxyazobenzene,
    diphenylazobenzene,
    naphthalene azobenzene,
    phenylazostilbene,
    azoxylbenzene,
    nitrobenzene,
    nitrosobenzene,
    phenylhydroxylamine.

EXAMPLE 2

The test is arranged as in Example 1, but four series-connected reactors are employed. Test reactants are set forth in Table 2, all other conditions being the same as Example 1.

TABLE 2

| Test No. | Reactor No. | Type of promoter | mMol promoter/ l. hexane | Solids content of solution, percent by weight | G. polymer/ g. VOCL₃ | G. polymer/ g. ethyl-Al-sesquichloride |
|---|---|---|---|---|---|---|
| 1 | 1 | | | 2.3 | 181 | 21 |
|   | 2 | | | 2.3 | 181 | 21 |
|   | 3 | | | 2.3 | 181 | 21 |
|   | 4 | | | 2.3 | 181 | 21 |
| 2 | 1 | | | 2.3 | 181 | 21 |
|   | 2 | Thionyl chloride | 0.75 | 4.2 | 330 | 39 |
|   | 3 | do | 0.75 | 6.1 | 478 | 56 |
|   | 4 | do | 0.75 | 7.3 | 573 | 67 |
| 3 | 1 | | | 2.2 | 173 | 20 |
|   | 2 | p-Toluenesulfochloride | 0.8 | 4.0 | 314 | 37 |
|   | 3 | do | 0.8 | 6.0 | 472 | 55 |
|   | 4 | do | 0.8 | 7.1 | 558 | 65 |
| 4 | 1 | | | 2.3 | 181 | 21 |
|   | 2 | Trichloroacetic acid methyl ester | 0.75 | 4.4 | 346 | 40 |
|   | 3 | do | 0.75 | 6.2 | 487 | 57 |
|   | 4 | do | 0.75 | 7.2 | 565 | 66 |

If the entire amount of the promoter is charged into only the first reactor, the solids contents in this reactor are between 4.5 and 5% by weight, and there is no further increase in the solids content of reactors 2 and 3. The terpolymerizates contain 4 to 5 double bonds per 1000 carbon atoms and between 45 and 50% by weight of propylene. They are vulcanizable with sulfur.

If, in place of propylene, butene-1 is employed, the conditions and results are similar.

EXAMPLE 3

The polymerization is conducted as in Example 2, but in place of ethyl aluminum sesquichloride, methyl aluminum sesquichloride is employed.

TABLE 3

| Test No. | Reactor No. | Type of promoter | mMol promoter/ l. hexane | Solids content of solution, percent by weight | G. polymer/ g. VOCl₃ | G. polymerizate/ g. methyl-Al-sesquichloride |
|---|---|---|---|---|---|---|
| 1 | 1 | | | 3.7 | 290 | 41 |
|   | 2 | | | 3.8 | 298 | 42 |
|   | 3 | | | 3.9 | 306 | 43 |
|   | 4 | | | 3.9 | 306 | 43 |
| 2 | 1 | | | 3.7 | 290 | 41 |
|   | 2 | Thionyl chloride | 0.75 | 5.1 | 400 | 56 |
|   | 3 | do | 0.75 | 7.0 | 549 | 77 |
|   | 4 | do | 0.75 | 8.2 | 644 | 91 |
| 3 | 1 | | | 3.6 | 283 | 40 |
|   | 2 | p-Toluenesulfochloride | 0.8 | 5.3 | 417 | 59 |
|   | 3 | do | 0.8 | 6.9 | 542 | 76 |
|   | 4 | do | 0.8 | 8.0 | 628 | 88 |
| 4 | 1 | | | 3.7 | 290 | 41 |
|   | 2 | Trichloroacetic acid methyl ester | 0.75 | 5.4 | 424 | 60 |
|   | 3 | do | 0.75 | 7.2 | 565 | 80 |
|   | 4 | do | 0.75 | 8.3 | 652 | 92 |

If the entire amount of promoter is charged only into reactor 1, the solids contents in this reactor range between 6 and 6.3% by weight; they increase only slightly in reactors 2 and 3, up to 6.5% by weight. The content of C=C double bonds of the terpolymerizates is between 3.5 and 4.5% by weight, and the propylene content is between 45 and 60% by weight. The terpolymerizates are vulcanizable with sulfur.

Similar results are obtained when using, instead— thionyl chloride:
  disulfur dibromide,
  tetrapropylene benzene sulfochloride,
  oleyl benzene sulfobromide,
  p-toluene sulfenyl chloride,
  trichloromethane sulfenyl chloride
p-toluene sulfochloride:
  perchlorocrotonic acid bromide trichloroacetic acid methyl ester:
  1.2.4.5.-tetrazine,
  1.2.4-triazine
  1.2.3.-triazoline,
  1.2.3-triazole,
  benzocinnoline.

EXAMPLE 4

The terpolymerization of ethylene, propylene, and dicyclopentadiene is conducted continuously in three series-connected reactors having a volume of 50 l., 100 l., and 200 l., respectively. First, the process is conducted in all three reactors without the addition of promoters. The catalyst components ethyl aluminum sesquichloride and VOCl₃ are added in only the first reactor, but the monomers are charged into all three reactors. The heat of polymerization is removed by precooling the introduced hexane to 0° C. and by external heat exchange with a regulatable cooling medium having a temperature of up to −10° C.

Again, the test conducted without the addition of promoters shows that the catalyst in the second and the third reactor becomes completely inactivated. Only by adding promoters in the second and the third reactor is the catalyst again reactivated.

Test conditions:
  0.5 millimol VOCl₃ per liter of hexane
  6 millimols ethyl aluminum sesquichloride per liter of hexane
  Pressure: 5 atmospheres absolute
  Temperature: 50° C.
  Molar charging ratio of ethylene:propylene:dicyclopentadiene: see Table 4

Available ethylene: see Table 4
Average residence time in the reactors: see Table 4

TABLE 4

| Reactor Number | Molar charging Ratio A:P:DCP [1] | Ethylene charged, kg./hour [2] | Average residence time, min. |
|---|---|---|---|
| 1 | 1:2:0.02 | 2.0 | 20 |
| 2 | 1:1:0.02 | 1.5 | 40 |
| 3 | 1:1:0.02 | 1.5 | 80 |

[1] For calculating the molar ratio of charged monomers, consideration is given only to those quantities of monomer freshly charged into the reactors.
[2] The quantity of ethylene freshly charged into the individual reactors is set forth.

The marked effect upon the solids content of the polymer solutions can be seen from Table 5.

introduced hexane to 0° C. and by external heat exchange with a regulatable cooling medium having a temperature of up to −10° C.

This test, conducted with the adddition of promoters only to the first reactor shows that the catalyst in the second and the third reactor becomes completely inactivated. Only by adding promoters also to the second and to the third reactor the catalyst is reactivated there too.

Test conditions:
0.5 mmol $VOCl_3$ per liter of hexane
6 mmol ethyl aluminum sesquichloride per liter of hexane
Pressure: 5 atmospheres absolute
Temperature: 50° C.
Molar charging ratio of ethylene:propylene:dichloropentadiene: see Table 4A

TABLE 5

| Test No. | Reactor No. | Type of promoter | mMol promoter/ l. hexane | Solids content of solution, percent by weight | G. polymer/ g. $VOCl_3$ | G. ploymer/ g. ethyl-Al- sesquichloride | RSV[1] | Ml-4[2] | Percent by wt. of propylene in polymerizate | Double bonds/ 1,000 C atom |
|---|---|---|---|---|---|---|---|---|---|---|
| 1 | 1 | | | 4.0 | 314 | 37 | 1.6 | 70 | 48 | 4.1 |
|   | 2 | | | 4.0 | 314 | 37 | 1.6 | 72 | 47 | 4.1 |
|   | 3 | | | 4.0 | 314 | 37 | 1.6 | 73 | 49 | 4.1 |
| 2 | 1 | | | 4.0 | 314 | 37 | 1.6 | 69 | 46 | 4.0 |
|   | 2 | Thionyl chloride | 1 | 7.3 | 573 | 67 | 1.3 | 55 | 46 | 4.1 |
|   | 3 | do | 1 | 9.4 | 738 | 86 | 1.2 | 46 | 48 | 3.9 |
| 3 | 1 | | | 4.0 | 314 | 37 | 1.6 | 71 | 49 | 4.1 |
|   | 2 | p-Toluenesulfochloride | 1 | 7.0 | 549 | 64 | 1.4 | 58 | 48 | 4.0 |
|   | 3 | do | 1 | 9.2 | 723 | 84 | 1.3 | 48 | 50 | 4.2 |
| 4 | 1 | | | 3.9 | 306 | 36 | 1.7 | 73 | 47 | 4.2 |
|   | 2 | Trichloroacetic acid methyl ester | 1 | 6.9 | 542 | 63 | 1.4 | 55 | 49 | 4.1 |
|   | 3 | do | 1 | 9.1 | 714 | 83 | 1.2 | 47 | 48 | 4.1 |

[1] Reduced specific viscosity measured in toluene at 20° C.
[2] Mooney viscosity according to DIN (German Industry Norm) 53523.

If the entire amount of the promoter is added only in the first reactor, the solids contents in all three reactors are about 7% by weight, but only if simultaneously the amount of charged monomer is doubled. A further increase in the monomer feed does not result in an increase in the solids content of the polymer solutions.

EXAMPLE 4A

The terpolymerization of ethylene, propylene and dicyclopentadiene is conducted continuously in three series-connected reactors having a volume of 50 l., 100 l. and 200 l., respectively. First, the process is conducted in that way, that the promoter and the catalyst (ethyl aluminum sesquichloride and $VOCl_3$) are added to the first reactor only, but the monomers are charged into all three reactors. The heat of polymerization is removed by precooling the Available ethylene: see Table 4A
Average residence time in the reactor: see Table 4A

TABLE 4A

| Reactor number | Molar charging ratio A:P:DCP [1] | Ethylene charged, kg./hour [2] | Average residence time, min. |
|---|---|---|---|
| 1 | 1:2:0.02 | 2 | 20 |
| 2 | 1:1:0.02 | 1.5 | 40 |
| 3 | 1:1:0.02 | 1.5 | 80 |

[1] For calculating the molar ratio of charged monomers, consideration is given only to those quantities of monomer freshly charged into the reactors.
[2] The quantity of ethylene freshly charged into the individual reactors is set forth.

The marked effect upon the solids content of the polymer solutions can be seen from Table 4B.

TABLE 4B

| Test No. | Reactor No. | Type of promoter | mMol promoter/ l. hexane | Solids content of solution, percent by weight | g. polymer/ g. $VOCl_3$ | g. polymer/ g. ethyl-Al-sesqui-chloride | RSV[1] | ML-4[2] | Percent by wt. of propylene in polymer | Double bonds/ 1000 C atoms |
|---|---|---|---|---|---|---|---|---|---|---|
| 1 | 1 | Trichloroacetic acid methylester | 1 | 7 | 549 | 64 | 1.2 | 52 | 46 | 3.9 |
|   | 2 | | | 7.1 | 557 | 65 | 1.3 | 55 | 45 | 4.0 |
|   | 3 | | | 7.1 | 557 | 65 | 1.3 | 54 | 46 | 3.9 |
| 2 | 1 | Trichloroacetic acid methyl ester | 1 | 7 | 549 | 64 | 1.3 | 54 | 45 | 4.0 |
|   | 2 | do | 0.8 | 10 | 785 | 92 | 1.2 | 50 | 45 | 3.9 |
|   | 3 | do | 0.9 | 12.5 | 982 | 115 | 1.2 | 49 | 47 | 4.1 |
| 3 | 1 | Thionylchloride | 1 | 7.5 | 588 | 69 | 1.1 | 49 | 45 | 4.0 |
|   | 2 | | | 7.5 | 588 | 69 | 1.1 | 47 | 42 | 3.9 |
|   | 3 | | | 7.6 | 597 | 70 | 1.2 | 48 | 43 | 3.9 |
| 4 | 1 | Thionylchloride | 1 | 7.4 | 582 | 68 | 1.1 | 48 | 44 | 3.8 |
|   | 2 | do | 0.9 | 10.5 | 825 | 96 | 1.0 | 45 | 46 | 4.0 |
|   | 3 | do | 0.8 | 13 | 1,021 | 119 | 1.0 | 44 | 45 | 3.9 |

See footnotes at end of Table 5.

EXAMPLE 5

The polymerization process is conducted in the same apparatus as in Example 4. The catalyst components $VOCl_3$ and ethyl aluminum sesquichloride are added in only the first reactor. The feeding of promoters takes place to all three reactors. Thereby, and by the increase in the catalyst and monomer charged, the solids content of the polymer solution in the first reactor can be increased up to 8% by weight, this at the same time, representing the solids limit for removing the heat of polymerization without difficulty in conventional equipment.

A test wherein the promoter was fed only into the first reactor demonstrates that the catalyst in reactors 2 and 3 has already become ineffective. The reactivation of the catalyst can only be accomplished by adding further promoter in reactors 2 and 3; the additional heat of polymerization can be removed by further external cooling.

Test conditions:

0.6 millimol $VOCl_3$ per liter of hexane 7.2 millimols of ethyl aluminum sesquichloride per liter of hexane Pressure: 5 atmospheres absolute Temperature: 50° C.

Molar charging ratio of ethylene:propylene:dicyclopentadiene: see Table 6

Ethlene charged: see Table 6

Average residence time in the reactor: see Table 6

Promoters charged: see Table 7

TABLE 6

| Reactor Number | Molar charging ratio A:P:DCP [1] | Ethylene charged, kg./hour [2] | Average residence time |
|---|---|---|---|
| 1 | 1:2:0.02 | 4 | 20 |
| 2 | 1:1:0.02 | 1.5 | 40 |
| 3 | 1:1:0.02 | 1.5 | 80 |

[1] For calculating the molar charging ratio, consideration is given only to those quantities of monomer freshly charged into the reactors.
[2] The quantity of ethylene freshly charged into the individual reactors is set forth.

The reactivating effect of the promoter upon the polymer solution which had become inactive without these additions is seen from Table 7.

TABLE 7

| Test No. | Reactor No. | Type of promoter | mMol promoter/l. hexane | Solids content of solution, percent by weight | G. polymer/ g. $VOCl_3$ | G. polymer/ g. ethyl-Al-sesquichloride | RSV= reduced specific viscosity | Mooney viscosity ML-4 | Percent by wt. of propylene in polymer | Double bonds per 1,000 C atoms |
|---|---|---|---|---|---|---|---|---|---|---|
| 1 | 1 | | | 4.5 | 294 | 34 | 1.8 | 81 | 49 | 4.3 |
|   | 2 | | | 4.5 | 294 | 34 | 1.8 | 79 | 46 | 4.0 |
|   | 3 | | | 4.5 | 294 | 34 | 1.8 | 79 | 48 | 4.1 |
| 2 | 1 | Thionyl chloride | 1 | 8.0 | 523 | 61 | 1.5 | 57 | 47 | 4.0 |
|   | 2 | | | 8.0 | 523 | 61 | 1.5 | 56 | 45 | 4.2 |
|   | 3 | | | 8.0 | 523 | 61 | 1.6 | 58 | 46 | 4.3 |
| 3 | 1 | Thionyl chloride | 1 | 8.0 | 523 | 61 | 1.6 | 55 | 48 | 4.1 |
|   | 2 | do | 0.75 | 10.7 | 840 | 98 | 1.4 | 46 | 48 | 4.4 |
|   | 3 | do | 0.80 | 13.8 | 1,083 | 126 | 1.3 | 42 | 51 | 4.1 |
| 4 | 1 | Trichloroacetic acid methylester. | 1 | 7.8 | 511 | 59 | 1.6 | 58 | 50 | 4.3 |
|   | 2 | do | | 7.8 | 511 | 59 | 1.6 | 56 | 48 | 4.0 |
|   | 3 | do | | 7.8 | 511 | 59 | 1.6 | 58 | 49 | 4.2 |
| 5 | 1 | Trichloroacetic acid methylester. | 1 | 7.8 | 511 | 59 | 1.6 | 57 | 49 | 3.9 |
|   | 2 | do | 0.8 | 10.9 | 845 | 100 | 1.4 | 47 | 51 | 3.9 |
|   | 3 | do | 0.8 | 13.7 | 1,075 | 125 | 1.2 | 41 | 50 | 4.1 |

If the entire amount of the promoter is charged into only the first reactor, the solids content ranges between 8.5 and 8.9% by weight; however, the heat of polymerization cannot be without difficulty removed; consequently, the temperature in the polymerization mass generally increases beyond the desired value.

EXAMPLE 6

The polymerization is conducted as set forth in Example 2, but different catalyst combinations are employed.

Test conditions:

0.6 millimol of vanadium compound per liter of hexane 6 millimols of organoaluminum compound per liter of hexane Ethylene charged: 60 l./h.

Pressure: 1 atmosphere absolute

Temperature: 35° C.

Average residence time in each of the three reactors: 1 hour.

TABLE 8

| Test No. | Reactor No. | Type of vanadium compound | Type of organo aluminum | Type of promoters | mMol promoter/l. hexane | Solids content of solution | G. polymer/ g. vanadium compound | G. polymer/ g. organo-aluminum compound |
|---|---|---|---|---|---|---|---|---|
| 1 | 1 | Vanadium triacetylacetonate. | Ethyl-Al-sesquichloride. | | | 2.6 | 103 | 24 |
|   | 2 | | | | | 2.6 | 103 | 24 |
|   | 3 | | | | | 2.6 | 103 | 24 |
|   | 4 | | | | | 2.6 | 103 | 24 |
| 2 | 1 | Vanadium triacetylacetonate. | Ethyl-Al-sesquichloride. | | | 2.7 | 107 | 25 |
|   | 2 | | | Thinoyl chloride | 0.75 | 4.3 | 171 | 39 |
|   | 3 | | | do | 0.75 | 6.2 | 246 | 57 |
|   | 4 | | | do | 0.75 | 7.5 | 298 | 69 |
| 3 | 1 | Vanadium oxytrichloride. | Ethyl-Al-dichloride | | | 2.4 | 188 | 23 |
|   | 2 | | | | | 2.4 | 188 | 23 |
|   | 3 | | | | | 2.4 | 188 | 23 |
|   | 4 | | | | | 2.4 | 188 | 23 |
| 4 | 1 | Vanadium oxytrichloride. | Ethyl-Al-dichloride | | | 2.4 | 188 | 23 |
|   | 2 | | | Trichloroacetic acid ethyl ester. | 0.75 | 4.0 | 314 | 38 |
|   | 3 | | | do | 0.75 | 6.0 | 472 | 56 |
|   | 4 | | | do | 0.75 | 7.1 | 557 | 67 |
| 5 | 1 | Vanadium triacetate | Ethyl-Al-dichloride | | | 2.7 | 161 | 25 |
|   | 2 | | | | | 2.7 | 161 | 25 |
|   | 3 | | | | | 2.7 | 161 | 25 |
|   | 4 | | | | | 2.7 | 161 | 25 |
| 6 | 1 | Vanadium triacetate | Ethyl-Al-dichloride | | | 2.6 | 155 | 24 |
|   | 2 | | | Trichloroacetic acid methyl ester. | 0.75 | 4.1 | 245 | 39 |
|   | 3 | | | | 0.75 | 5.9 | 352 | 55 |
|   | 4 | | | | 0.75 | 7.3 | 437 | 69 |

If the entire amount of the promoter is charged into only the first reactor, the solids content drops below 6% by weight, and does not increase in reactors 2, 3, and 4. The content of double bonds of the terpolymerizates is between 3 and 4 double bonds per 1,000 carbon atoms, and the propylene content is between 40 and 60% by weight. The resultant terpolymerizates can be vulcanized in sulfur.

EXAMPLE 7

The polymerization is conducted as in Example 2, but different polyunsaturated hydrocarbons are employed as the tercomponent in the terpolymerization with ethylene and propylene.

The polymerization is conducted under substantially atmospheric pressure, the average residence time in each of the reactors being one hour. The amount of ethylene charged is 70 liters per hour; the monomers are maintained in excess and are aded in only the first reactor. The other reaction conditions can be seen from Table 9.

TABLE 9

| Test No. | Reactor No. | Vanadium compound | mMol/ l. hexane | Organo-aluminum compound | mMol/ l. hexane | Polymerization temperature, °C. | Diene or triene | Molar charging ratio ethylene: propylene: diene or triene | Promoter, mmol/ l. hexane | Solids content of solution, percent by weight | G. polymerizate, g. vanadium compound | G. polymerizate, g. organo-aluminum compound |
|---|---|---|---|---|---|---|---|---|---|---|---|---|
| 1 | 1 | Vanadium oxytrichloride. | 0.5 | Ethyl-Al-sesquichloride. | 6 | 35 | Hexadiene-1.4. | 1:2:0.1 | | 5.5 | 432 | 50 |
| | 2 | | | | | | | | | 5.5 | 432 | 50 |
| | 3 | | | | | | | | | 5.5 | 432 | 50 |
| | 4 | | | | | | | | | 5.5 | 432 | 50 |
| 2 | 1 | Vanadium oxytrichloride. | 0.5 | Ethyl-Al-sesquichloride. | 6 | 35 | Hexadiene-1.4. | 1:2:0.1 | | 5.5 | 432 | 50 |
| | 2 | | | | | | | | 0.7 | 6.7 | 526 | 61 |
| | 3 | | | | | | | | 0.7 | 7.7 | 605 | 71 |
| | 4 | | | | | | | | 0.7 | 8.8 | 691 | 81 |
| 3 | 1 | Vanadium oxytrichloride. | 0.5 | Ethyl-Al-sesquichloride. | 6 | 40 | 5-(methylene)-norbornene-2. | 1:2:0.04 | | 4.0 | 314 | 37 |
| | 2 | | | | | | | | | 4.1 | 322 | 38 |
| | 3 | | | | | | | | | 4.1 | 322 | 38 |
| | 4 | | | | | | | | | 4.1 | 322 | 38 |
| 4 | 1 | Vanadium oxytrichloride. | 0.5 | Ethyl-Al-sesquichloride. | 6 | 40 | 5-(methylene)-norbornene-2. | 1:2:0.04 | | 4.1 | 322 | 38 |
| | 2 | | | | | | | | 0.75 | 6.2 | 487 | 57 |
| | 3 | | | | | | | | 0.75 | 7.2 | 565 | 66 |
| | 4 | | | | | | | | 0.75 | 7.9 | 620 | 72 |
| 5 | 1 | Vanadium oxytrichloride. | 0.5 | Ethyl-Al-sesquichloride. | 6 | 35 | 5-(cyclohexen-3-yl)-norbornene-2. | 1:2:0.05 | | 4.4 | 345 | 40 |
| | 2 | | | | | | | | | 4.4 | 345 | 40 |
| | 3 | | | | | | | | | 4.4 | 345 | 40 |
| | 4 | | | | | | | | | 4.4 | 345 | 40 |
| 6 | 1 | Vanadium oxytrichloride. | 0.5 | Ethyl-Al-sesquichloride. | 6 | 35 | 5-(cyclohexen-3-yl)-norbornene-2. | 1:2:0.05 | | 4.4 | 345 | 40 |
| | 2 | | | | | | | | 0.7 | 5.3 | 416 | 49 |
| | 3 | | | | | | | | 0.7 | 6.4 | 503 | 59 |
| | 4 | | | | | | | | 0.7 | 7.2 | 565 | 66 |
| 7 | 1 | Vanadium oxytrichloride. | 0.5 | Ethyl-Al-sesquichloride. | 6 | 35 | 5-(buten-2-yl)-norbornene-2. | 1:2:0.05 | | 4.0 | 314 | 37 |
| | 2 | | | | | | | | | 4.0 | 314 | 37 |
| | 3 | | | | | | | | | 4.0 | 314 | 37 |
| | 4 | | | | | | | | | 4.0 | 314 | 37 |
| 8 | 1 | Vanadium oxytrichloride. | 0.5 | Ethyl-Al-sesquichloride. | 6 | 35 | 5-(buten-2-yl)-norbornene-2. | 1:2:0.05 | | 4.0 | 314 | 37 |
| | 2 | | | | | | | | 0.75 | 6.1 | 479 | 56 |
| | 3 | | | | | | | | 0.75 | 7.5 | 588 | 69 |
| | 4 | | | | | | | | 0.75 | 8.6 | 676 | 79 |
| 9 | 1 | Vanadium oxytrichloride. | 0.5 | Ethyl-Al-sesquichloride. | 6 | 35 | 5-(2 methyl-buten-2-yl)-norbornene-2. | 1:2:0.05 | | 3.9 | 306 | 36 |
| | 2 | | | | | | | | | 3.9 | 306 | 36 |
| | 3 | | | | | | | | | 3.9 | 306 | 36 |
| | 4 | | | | | | | | | 3.9 | 306 | 36 |
| 10 | 1 | Vanadium oxytrichloride. | 0.5 | Ethyl-Al-sesquichloride. | 6 | 35 | 5-(3-methyl-buten-2-yl)-norbornene-2. | 1:2:0.05 | | 4.0 | 314 | 37 |
| | 2 | | | | | | | | 0.75 | 6.2 | 487 | 57 |
| | 3 | | | | | | | | 0.75 | 7.9 | 620 | 72 |
| | 4 | | | | | | | | 0.75 | 8.8 | 691 | 81 |

TABLE 9—Continued

| Test No. | Reactor No. | Vanadium compound | mMol/l. hexane | Organo-aluminum compound | mMol/l. hexane | Polymerization temperature, °C | Diene or triene | Molar charging ratio ethylene: propylene: diene or triene | Promoter, mmol/l. hexane | Solids content of solution, percent by weight | G. polymerizate, g. vanadium compound | G. polymerizate, g. organoaluminum compound |
|---|---|---|---|---|---|---|---|---|---|---|---|---|
| 11 | 1 | Vanadium oxytrichloride. | 0.5 | Ethyl-Al-sesquichloride. | 6 | 40 | 5-(3,5-dimethyl-hexen-4-yl)-norbornene-2. | 1:2:0.05 | | 3.9 | 306 | 36 |
|  | 2 | | | | | | | | | 3.9 | 306 | 36 |
|  | 3 | | | | | | | | | 3.9 | 306 | 36 |
|  | 4 | | | | | | | | | 3.9 | 306 | 36 |
| 12 | 1 | Vanadium oxytrichloride. | 0.5 | Ethyl-Al-sesquichloride. | 6 | 40 | 5-(3,5-dimethyl-hexen-4-yl)-norbornene-2. | 1:2:0.05 | | 3.9 | 306 | 36 |
|  | 2 | | | | | | | | 0.7 | 6.1 | 479 | 56 |
|  | 3 | | | | | | | | 0.7 | 7.6 | 597 | 70 |
|  | 4 | | | | | | | | 0.7 | 8.6 | 676 | 79 |
| 13 | 1 | Vanadium oxytrichloride. | 0.75 | Diethyl-Al-chloride. | 7.5 | 15 | Cyclooctadiene-1,5. | 1:3:1 | | 3.5 | 165 | 26 |
|  | 2 | | | | | | | | | 3.6 | 169 | 27 |
|  | 3 | | | | | | | | | 3.6 | 169 | 27 |
|  | 4 | | | | | | | | | 3.7 | 174 | 28 |
| 14 | 1 | Vanadium oxytrichloride. | 0.75 | Diethyl-Al-chloride. | 7.5 | 15 | Cyclooctadiene-1,5. | 1:3:1 | | 3.6 | 169 | 27 |
|  | 2 | | | | | | | | 0.75 | 4.8 | 226 | 36 |
|  | 3 | | | | | | | | 0.75 | 5.8 | 273 | 44 |
|  | 4 | | | | | | | | 0.75 | 6.5 | 306 | 49 |
| 15 | 1 | Vanadium oxytrichloride. | 0.5 | Ethyl-Al-sesquichloride. | 6 | 40 | n-Decatriene-1,4,9. | 1:2:0.04 | | 3.8 | 299 | 35 |
|  | 2 | | | | | | | | | 3.8 | 299 | 35 |
|  | 3 | | | | | | | | | 3.8 | 299 | 35 |
|  | 4 | | | | | | | | | 3.8 | 299 | 35 |
| 16 | 1 | Vanadium oxytrichloride. | 0.5 | Ethyl-Al-sesquichloride. | 6 | 40 | n-Decatriene-1,4,9. | 1:2:0.04 | | 3.8 | 299 | 35 |
|  | 2 | | | | | | | | 0.7 | 5.6 | 440 | 51 |
|  | 3 | | | | | | | | 0.7 | 6.9 | 542 | 63 |
|  | 4 | | | | | | | | 0.7 | 7.9 | 620 | 72 |
| 17 | 1 | Vanadium oxytrichloride. | 0.5 | Ethyl-Al-sesquichloride. | 6 | 35 | 3-methyl-hexadiene-1,4. | 1:2:0.1 | | 5.3 | 416 | 49 |
|  | 2 | | | | | | | | | 5.3 | 416 | 49 |
|  | 3 | | | | | | | | | 5.3 | 416 | 49 |
|  | 4 | | | | | | | | | 5.3 | 416 | 49 |
| 18 | 1 | Vanadium oxytrichloride. | 0.5 | Ethyl-Al-sesquichloride. | 6 | 35 | 3-methyl-hexadiene-1,4. | 1:2:0.1 | | 5.3 | 416 | 49 |
|  | 2 | | | | | | | | 0.7 | 6.9 | 542 | 63 |
|  | 3 | | | | | | | | 0.7 | 7.9 | 620 | 72 |
|  | 4 | | | | | | | | 0.7 | 8.7 | 683 | 80 |

Similar results are obtained with methyl cyclooctadiene and dimethyl cyclooctadiene, as well as with 4-methylhexadiene-1,4.

Again, the solids content, if the entire amount of the promoter is added only in the first reactor, are lower in the first reactor than in the process of the invention disclosed above wherein the catalyst is reactivated in a multistage reaction. Also, the solids content in reactors 2, 3, and 4 does not increase further if the entire amount of promoter is aded in only the first reactor 1.

EXAMPLE 8

The polymerization is conducted as in Example 2 with the difference that copolymerizates from ethylene and propylene, as well as from ethylene and butylene-2 are produced.

Test conditions:
 0.3 millimol of $VOCl_3$ per liter of hexane
 3.6 millimols of ethyl aluminum sesquichloride per liter of hexane
 Molar charging ratio of ethylene:propylene [butylene-2]=1:2.
 Ethylene charged: 80 l./h.
 Pressure: 1 atmosphere absolute
 Temperature: 40° C.
 Average residence time in the reactors: respectively 1 hour.

TABLE 10

| Test No. | Reactor No. | Type of 1-olefin | Type of promoter | mMol promoter/ l. hexane | Solids content of solution, percent by weight | G. polymer/ g. VOCl$_3$ | G. polymer/g. ethyl-Al-sesquichloride |
|---|---|---|---|---|---|---|---|
| 1 | 1 | Propylene | | | 5.6 | 732 | 85 |
|   | 2 | | | | 2.7 | 745 | 87 |
|   | 3 | | | | 5.7 | 745 | 87 |
|   | 4 | | | | 5.7 | 745 | 87 |
| 2 | 1 | Prypylene | Thionyl/chloride | | 5.6 | 732 | 85 |
|   | 2 | | | 0.5 | 7.6 | 995 | 116 |
|   | 3 | | | 0.5 | 8.9 | 1,163 | 136 |
|   | 4 | | | 0.5 | 10.3 | 1,347 | 157 |
| 3 | 1 | Propylene | Trichloroacetic acid ethyl ester | | 5.5 | 730 | 84 |
|   | 2 | | | 0.5 | 7.5 | 980 | 115 |
|   | 3 | | | 0.5 | 9.0 | 1,178 | 137 |
|   | 4 | | | 0.5 | 10.4 | 1,360 | 159 |
| 4 | 1 | Butylene-1 | | | 4.7 | 615 | 72 |
|   | 2 | | | | 4.7 | 615 | 72 |
|   | 3 | | | | 4.7 | 615 | 72 |
|   | 4 | | | | 4.7 | 615 | 72 |
| 5 | 1 | Butylene-1 | Thionyl/chloride | | 4.7 | 615 | 72 |
|   | 2 | | | 0.5 | 5.9 | 772 | 90 |
|   | 3 | | | 0.5 | 6.7 | 876 | 102 |
|   | 4 | | | 0.5 | 7.8 | 1,020 | 119 |
| 6 | 1 | Butylene-1 | Trichloroacetic acid methyl ester | | 4.8 | 627 | 73 |
|   | 2 | | | 0.5 | 6.1 | 797 | 93 |
|   | 3 | | | 0.5 | 7.2 | 942 | 110 |
|   | 4 | | | 0.5 | 8.0 | 1,047 | 122 |

If the entire amount of the promoter is added in only reactor 1, the solids content of the ethylene-propylene copolymerizate is about 7% by weight, and that of the ethylene-butylene-2 copolymerizate about 6.5% by weight. In this case, no increase in solids content occurs from reactor 1 to reactor 4.

The preceding examples can be repeated with similar success by substituting the generically and specifically described reactants and operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and intended to be, within the full range of equivalence of the following claims.

What is claimed is:

1. In a polymerization process for the production of amorphous copolymers of 1-olefins, copolymers of 1-olefins and multiple olefins, or terpolymers of multiple olefins with at least two 1-olefins, which comprises conducting the polymerization in the presence of a Ziegler-type catalyst of (A) a vanadium compound and (B) an organoaluminum compound, and a promoter selected from the group consisting of alkyl esters of chlorinated alkanoic acid, and a sulfur compound selected from the group consisting of

$R-SO_2-X$

$R-SO-X$

$R-S-X$

$S_nX_2$ and mixtures thereof, wherein

R represents halogen, alkyl of 1 to about 12 carbon atoms, cycloalkyl of 4 to 22 carbon atoms and 1 to 5 rings, aryl of 6 to 22 carbon atoms and 1 to 5 rings, or halogenated derivatives of the previously described alkyl, cycloalkyl and aryl, with the provision that R is not halogen when the sulfur compound is R—S—X;

X represents halogen, and $n$ is 1-2, whereby conversion of monomer into the polymer is substantially increased over the conversion obtained with only the Ziegler-type catalyst, the improvement comprising conducting said process in at least three serially connected reactors, and adding said promoter to all but the first of said reactors, adding said Ziegler-type catalyst to only the first of said reactors, adding the total amount of monomer to said first reactor and conducting said reaction so that said Ziegler-type catalyst is completely expended in said first reactor, but with incomplete polymerization in said first reactor, said promoter being added on moles of metal-carbon bond or metal-hydride bond of the organoaluminum compound in the catalyst except if diethyl aluminum monochloride is employed, said amount may be doubled.

2. A process as defined by claim 1 wherein before addition of said promoter, the polymerization solution is cooled.

3. A process as defined by claim 1, wherein said promoter is thionylchloride.

4. A process as defined by claim 1 wherein the organoaluminum compound is selected from the group consisting of diethyl aluminum chloride, diethyl aluminum bromide, ethyl aluminum dichloride, ethyl aluminum dibromide, ethyl aluminum sesquichloride, and methyl aluminum sesquichloride.

5. A process as defined by claim 4 wherein (A) is a hydrocarbon-soluble vanadium compound.

6. A process as defined by claim 5 wherein the compound is selected from the group consisting of vanadium trichloride, vanadium tetrachloride, and vanadium oxytrichloride.

References Cited

UNITED STATES PATENTS

| 3,301,834 | 1/1967 | Christman | 260—80.78 |
| 3,317,499 | 5/1967 | Nakaguchi et al. | 260—93.7 |
| 3,328,366 | 6/1967 | Nakaguchi et al. | 260—88.2 |
| 3,341,503 | 9/1967 | Paige et al. | 260—80.78 |
| 3,444,149 | 5/1969 | Kelly | 260—80.78 |
| 3,349,064 | 10/1967 | Gumboldt et al. | 260—80.78 |

JOSEPH L. SCHOFER, Primary Examiner

E. J. SMITH, Assistant Examiner

U.S. Cl. X.R.

252—429 B; 260—88.2, 94.9 C